United States Patent
Vitaladevuni et al.

(10) Patent No.: US 9,704,478 B1
(45) Date of Patent: Jul. 11, 2017

(54) AUDIO OUTPUT MASKING FOR IMPROVED AUTOMATIC SPEECH RECOGNITION

(71) Applicant: Amazon Technologies, Inc., Reno, NV (US)

(72) Inventors: Shiv Naga Prasad Vitaladevuni, Cambridge, MA (US); Amit Singh Chhetri, Santa Clara, CA (US); Phillip Ryan Hilmes, San Jose, CA (US); Rohit Prasad, Acton, MA (US)

(73) Assignee: Amazon Technologies, Inc., Seattle, WA (US)

(*) Notice: Subject to any disclaimer, the term of this patent is extended or adjusted under 35 U.S.C. 154(b) by 159 days.

(21) Appl. No.: 14/094,591

(22) Filed: Dec. 2, 2013

(51) Int. Cl.
*G10L 15/00* (2013.01)
*G10L 15/02* (2006.01)

(52) U.S. Cl.
CPC .................................. *G10L 15/02* (2013.01)

(58) Field of Classification Search
CPC ......... G10L 15/02; G10L 25/48; G10L 25/90; G10L 19/012; G10L 21/0232; H04R 1/1083; H04R 3/005; H04R 2225/41; H04R 2410/05
USPC ....... 704/254, 500, 278, 275, 235, 233, 229, 704/226, 208, 207, 205, 200.1; 707/769; 700/94; 381/94.3, 92, 66, 57, 317
See application file for complete search history.

(56) References Cited

U.S. PATENT DOCUMENTS

| | | | | |
|---|---|---|---|---|
| 4,953,212 A * | 8/1990 | Otsubo | .................. | G10H 1/361 369/86 |
| 5,806,022 A * | 9/1998 | Rahim | .................... | G10L 15/02 379/406.03 |
| 5,970,446 A * | 10/1999 | Goldberg | ................ | G10L 15/20 704/233 |
| 8,126,706 B2 * | 2/2012 | Ebenezer | ............. | G10H 1/0058 704/208 |
| 2005/0244019 A1 * | 11/2005 | Lallemand | ............. | G10H 1/125 381/94.3 |
| 2006/0025994 A1 * | 2/2006 | Christoph | ................. | H03G 3/32 704/229 |
| 2008/0137873 A1 * | 6/2008 | Goldstein | ............ | H04R 1/1016 381/57 |
| 2009/0144053 A1 * | 6/2009 | Tamura | .................... | G10L 13/06 704/207 |
| 2010/0250242 A1 * | 9/2010 | Li | ............................ | G10L 17/02 704/200.1 |
| 2011/0054910 A1 * | 3/2011 | Fujihara | ................ | G10L 15/265 704/278 |

(Continued)

*Primary Examiner* — Michael Colucci
(74) *Attorney, Agent, or Firm* — Knobbe, Martens, Olson & Bear, LLP

(57) ABSTRACT

Features are disclosed for filtering portions of an output audio signal in order to improve automatic speech recognition on an input signal which may include a representation of the output signal. A signal that includes audio content can be received, and a frequency or band of frequencies can be selected to be filtered from the signal. The frequency band may correspond to a desired frequency band for speech recognition. An input signal can be obtained comprising audio data corresponding to a user utterance and presentation of the output signal. Automatic speech recognition can be performed on the input signal. In some cases, an acoustic model trained for use with such frequency band filtering may be used to perform speech recognition.

25 Claims, 5 Drawing Sheets

(56) References Cited

U.S. PATENT DOCUMENTS

| | | | | |
|---|---|---|---|---|
| 2011/0060587 A1* | 3/2011 | Phillips | .................. | G10L 15/30 |
| | | | | 704/235 |
| 2011/0293103 A1* | 12/2011 | Park | .................. | G10K 11/1782 |
| | | | | 381/57 |
| 2012/0102066 A1* | 4/2012 | Eronen | ............. | G06F 17/30743 |
| | | | | 707/769 |
| 2012/0215546 A1* | 8/2012 | Biswas | .................. | G10H 1/40 |
| | | | | 704/500 |
| 2012/0310636 A1* | 12/2012 | Ookuri | ............... | G10K 11/1786 |
| | | | | 704/226 |
| 2013/0304243 A1* | 11/2013 | Iseli | ........................ | G06F 17/00 |
| | | | | 700/94 |
| 2014/0056435 A1* | 2/2014 | Kjems | .................. | H04M 9/082 |
| | | | | 381/66 |
| 2014/0056439 A1* | 2/2014 | Kim | ........................ | H04R 3/00 |
| | | | | 381/92 |
| 2014/0142958 A1* | 5/2014 | Sharma | .................. | G10L 19/02 |
| | | | | 704/500 |
| 2014/0254842 A1* | 9/2014 | Smith | .................... | H04R 25/50 |
| | | | | 381/317 |
| 2014/0257821 A1* | 9/2014 | Adams | .................. | G10L 25/93 |
| | | | | 704/275 |
| 2014/0307882 A1* | 10/2014 | LeBlanc | ................. | H04S 7/305 |
| | | | | 381/66 |
| 2015/0221319 A1* | 8/2015 | Cartwright | ............ | G10L 19/008 |
| | | | | 704/205 |

* cited by examiner

AUDIO OUTPUT MASKING FOR IMPROVED AUTOMATIC SPEECH RECOGNITION

BACKGROUND

Natural language processing systems include various modules and components for receiving input from a user (e.g., audio, text, etc.) and determining what the user meant. In some implementations, a natural language processing system includes an automatic speech recognition ("ASR") module that receives audio input of a user utterance and generates one or more likely transcriptions of the utterance. Automatic speech recognition modules typically include an acoustic model and a language model. The acoustic model is used to generate hypotheses regarding which subword units (e.g. phonemes or triphones) correspond to an utterance based on the acoustic features of the utterance. The language model is used to determine the most likely transcription of the utterance based on the hypotheses generated using the acoustic model and lexical features of the language in which the utterance is spoken.

Many devices configured to obtain audio data of user utterances include both a loudspeaker and a microphone. The loudspeaker is used to play audio signals, such as speech from a remote source during a telephone call, audio content presented from local storage or streamed from a network etc. The microphone is used to capture audio signals from a local source, such as a user speaking voice commands or other utterances. An acoustic echo occurs when the remote signal emitted by the loudspeaker is captured by the microphone, after undergoing reflections in the local environment.

An acoustic echo canceller ("AEC") may be used to remove acoustic echo from an audio signal captured by a microphone in order to facilitate improved communication. The AEC typically filters the microphone signal by determining an estimate of the acoustic echo (e.g., the remote audio signal emitted from the loudspeaker and reflected in the local environment). The AEC can then subtract the estimate from the microphone signal to produce an approximation of the true local signal (e.g., the user's utterance). The estimate is obtained by applying a transformation to a reference signal that corresponds to the remote signal emitted from the loudspeaker. The transformation is typically implemented using an adaptive algorithm. Adaptive transformation relies on a feedback loop, which continuously adjusts a set of coefficients that are used to calculate the estimated echo from the far-end signal. Different environments produce different acoustic echoes from the same loudspeaker signal, and any change in the local environment may change the way that echoes are produced. By using a feedback loop to continuously adjust the coefficients, an AEC to can adapt its echo estimates to the local environment in which it operates.

BRIEF DESCRIPTION OF DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

DETAILED DESCRIPTION

Introduction

Figure 1:
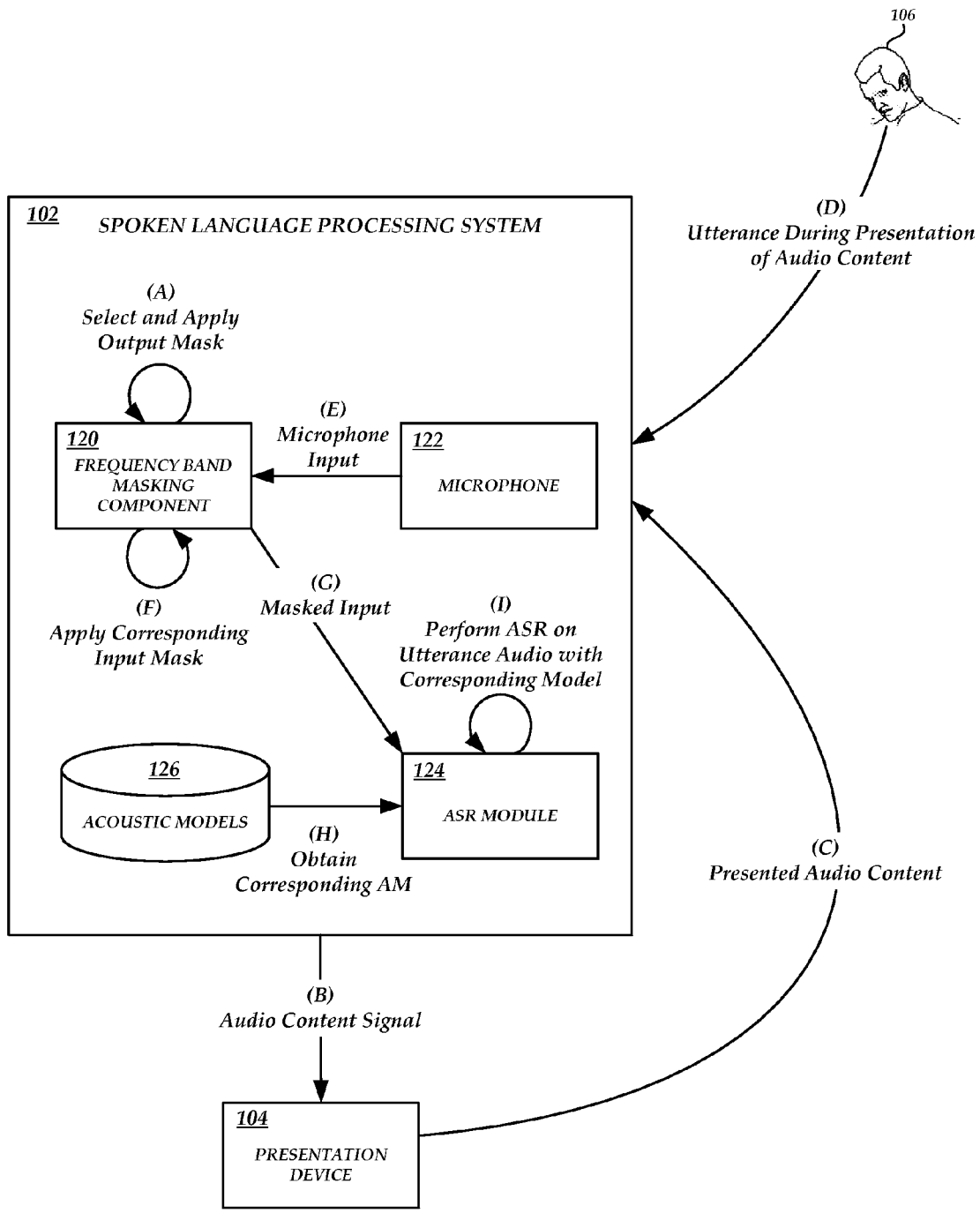
FIG. 1 is a block diagram of illustrative data flows and operations of a communication system configured to mask output frequencies and perform automatic speech recognition on input.

The present disclosure is directed to modifying audio output to improve automatic speech recognition ("ASR") on input that may include the audio output. Computing systems configured to perform speech recognition on user utterances often receive audio input including the user utterances and other audio information, such as music, environmental noise, and the like. Such additional audio information can interfere with recognition of the user utterance. When the source of the additional audio information is an electronic signal presented via an output, such as a speaker, the additional audio information included in the audio input may be an acoustic echo of the presented signal. Devices often include acoustic echo cancellers ("AECs") that attempt to remove acoustic echo from audio input, leaving only the spoken input (and environmental noise). AECs use a reference signal representing the audio signal that is output through the speaker in order to determine what to remove from the input signal received via a microphone. For example, when music is presented via a speaker, the signal from the music source is the reference signal. AECs typically include adaptive filters which transform the internal representation of the reference signal according to the acoustic reflections caused by the local environment. However, even well-trained AECs tend to leave residual noise (e.g., residual noise due to imperfections in the echo cancellation, or ambient noise from the environment) that may interfere with downstream consumers of microphone input, such as automatic speech recognition systems.

Aspects of the present disclosure relate to masking off portions of audio signals that are output through a presentation device, such as a speaker. This masking can improve ASR performance on input that may include the output (e.g., input that may include an acoustic echo of the output). In some embodiments, certain frequency bands in an output audio signal may be filtered out (e.g., partially or completely removed from the output) such that the filtered output sounds substantially the same as the unfiltered output or otherwise meets some quality or perceptual criteria. For example, the frequency bands that are filtered may be chosen due to the lack of important music information in those bands. A user may then listen to the music and initiate a spoken command. When audio input that includes the filtered output and the spoken command is received via a microphone, ASR may be performed with particular sensitivity to the frequency bands that were filtered from the output. Such sensitivity to those particular frequency bands may produce better ASR results because those frequency bands are less likely to include acoustic echo or other audio interference. In some embodiments, the audio input may be filtered, prior to performing ASR, in a manner that is complementary to the output filters. For example, the portions of audio output that were not removed prior to output may be partially or completely removed from the input. In this way, the remaining portions of the input signal (e.g., corresponding to the frequency bands filtered from the audio output prior to its presentation) may consist primarily of user utterance audio information.

Additional aspects of the present disclosure relate to defining or generating output masks and acoustic models trained to be used in conjunction with the output masks. A spoken language processing system may implement any number of output masks and acoustic models. The output masks may be designed for use with specific types of sound. For example, output masks may be configured for use with certain genres of music. The specific frequencies or frequency bands that are filtered, and the degree to which they are filtered (e.g., completely filtered, or partially filtered using weights), may be determined based on acoustic or perceptual properties of the individual genres. The frequencies may be chosen to provide a low user-perceivable effect on the output while also providing a satisfactory level of improvement to the ASR process (e.g., by reducing interference with frequencies that contain important utterance information). As another example, output masks may be configured for use with particular users or vocal characteristics. The specific frequencies or frequency bands of output to be filtered may be chosen based on the utterance audio information expected to be received in those frequency bands (e.g., utterance audio from male users typically includes important information at lower frequencies than utterance audio from females or children). By removing audio output from those bands, an ASR component may receive audio data that includes the important utterance audio frequencies with little or no interference from music or other audio output. In some embodiments, acoustic models may be trained for use with particular output masks. For example, each output mask that is defined or generated may have a corresponding acoustic model that has been trained on training data limited to, or based primarily on, portions of the frequency spectrum which have been filtered from the audio output.

Although aspects of the embodiments described in the disclosure will focus, for the purpose of illustration, on masking output based on certain criteria such as music genre, user vocal characteristics, anticipation of device-directed speech and the like, one skilled in the art will appreciate that these examples are illustrative only and are not intended to be limiting. The techniques disclosed herein may be applied to any number of processes or applications for performing automatic speech recognition. Various aspects of the disclosure will now be described with regard to certain examples and embodiments, which are intended to illustrate but not limit the disclosure.

Spoken Language Processing Environment

With reference to an illustrative embodiment, FIG. 1 shows example interactions and data flows between a spoken language processing system 102, a presentation device 104, and a user 106. The spoken language processing system 102 can correspond to a wide variety of electronic devices or some combination thereof. In some embodiments, the spoken language processing system 102 may be a computing device that includes one or more processors and a memory which may contain software applications executed by the processors. The spoken language processing system 102 may include or be in communication with one or more microphones 122 or other audio input components for accepting speech input on which to perform speech recognition. The spoken language processing system 102 may also include a frequency band masking component 120 to select and apply filters to audio output and/or audio input as described in greater detail below. Additional hardware and/or software modules or components of the spoken language processing system 102 may include an ASR module 124 for performing speech recognition on an audio signal that corresponds to a user utterance. For example, the user 106 can issue spoken commands to the spoken language processing system 102 in order to get directions, listen to music, query a data source, dictate a document or message, or the like. The spoken language processing system 102 may also include an acoustic models data store 126 for storing various acoustic models corresponding to output masks applied by the frequency band masking component 120.

Illustratively, the spoken language processing system 102 may be (or be part of) a personal computing device, laptop computing device, hand held computing device, terminal computing device, server computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance.

The spoken language processing system 102 may include, or communicate with, a presentation device 104. The presentation device 104 may present audio content, audiovisual content, or some other content obtained from the spoken language processing system 102 or some other source. For example, the presentation device 104 may be a speaker integrated into the spoken language processing system 102, a separate speaker or group of speakers, a television, a home entertainment system, or the like.

Figure 2:
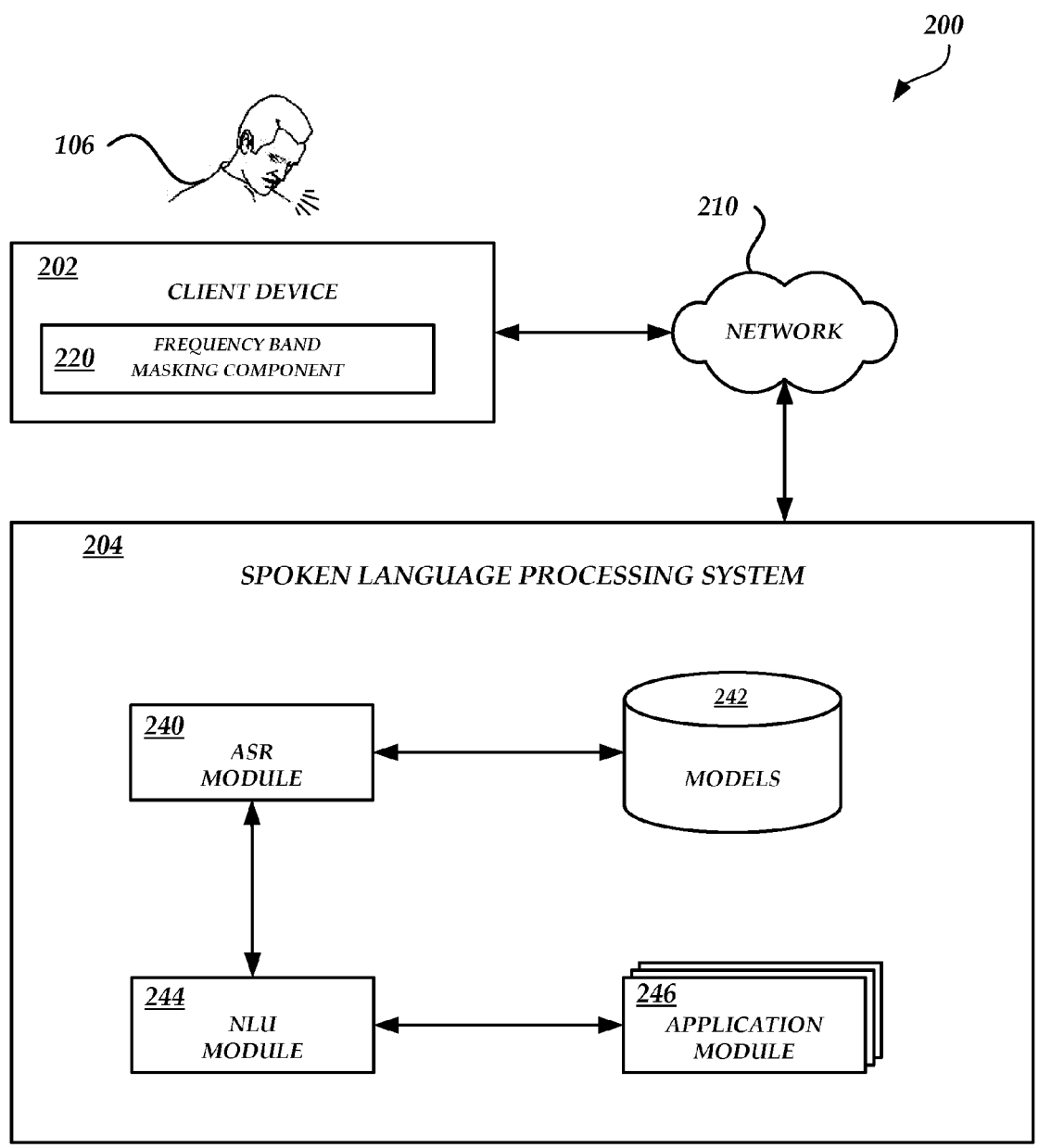
FIG. 2 is a block diagram of an illustrative network environment in which aspects of the present disclosure may be implemented.

In some embodiments, the spoken language processing system may be implemented as a network-accessible system or service, and a user may interact with a client device that provides audio data to the network-accessible service for ASR processing. FIG. 2 shows an example of such a networked environment 200. As shown, an ASR module 240 may be part of a network-accessible spoken language processing system 204 in communication with the client device 202 via a communication network 210.

The communication network 210 may be any wired network, wireless network, or combination thereof. In addition, the network 210 may be a personal area network, local area network, wide area network, cable network, satellite network, cellular telephone network, or combination thereof. For example, the communication network 210 may be a publicly accessible network of linked networks, possibly operated by various distinct parties, such as the Internet. In some embodiments, the communication network 210 may be a private or semi-private network, such as a corporate or university intranet. The communication network 210 may include one or more wireless networks, such as a Global System for Mobile Communications ("GSM") network, a Code Division Multiple Access ("CDMA") network, a Long Term Evolution ("LTE") network, or some other type of wireless network. Protocols and components for communicating via the Internet or any of the other aforementioned types of communication networks are well known to those skilled in the art of computer communications and thus need not be described in more detail herein.

A user 106 may use the client device 202 to submit utterances, receive information, and initiate various processes, either on the client device 202 or at the spoken language processing system 204. For example, the user 106 can listen to music via the client device 202 (or some system or output component in communication with the client device) and issue spoken commands to the client device 202. The client device 202 may include a frequency band masking component 220, similar to the frequency band masking component described above and in greater detail below.

The network-accessible spoken language processing system 204 may include additional components for performing spoken language processing, such as a models data store 242 similar to the models data store described above and in greater detail below, a natural language understanding ("NLU") module 244, and one or more application modules 246. Illustratively, the ASR module 240 may generate speech recognition results (e.g., one or more likely transcripts of the user utterance), and the NLU module 244 may use the speech recognition results to determine the user's intent or to otherwise determine the semantic meaning of the utterance. An appropriate application module 246 may then perform some action responsive to the user's intent, such as providing driving directions in response to a query, playing a piece of music in response to a command, etc. In some embodiments, the spoken language processing system 102 of FIG. 1 may include an NLU module, one or more application modules, or the like.

In some embodiments, the features and services provided by the spoken language processing system 204 may be implemented as web services consumable via a communication network 210. In further embodiments, the spoken language processing system 204 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Returning to FIG. 1, the spoken language processing system 102 may be used to present output to the user 106. For example, the spoken language processing system may be (or be part of) a computing device that presents music, movies, television shows, on-demand broadcasts ("podcasts"), or the like. Illustratively, the user may initiate presentation of a particular piece of classical music. In response, the frequency band masking component 120 may analyze the audio output signal, metadata associated with the audio output signal, information about the user, information associated with the user request, and/or other appropriate information to determine which frequency or band of frequencies to filter at (A).

Figure 3:
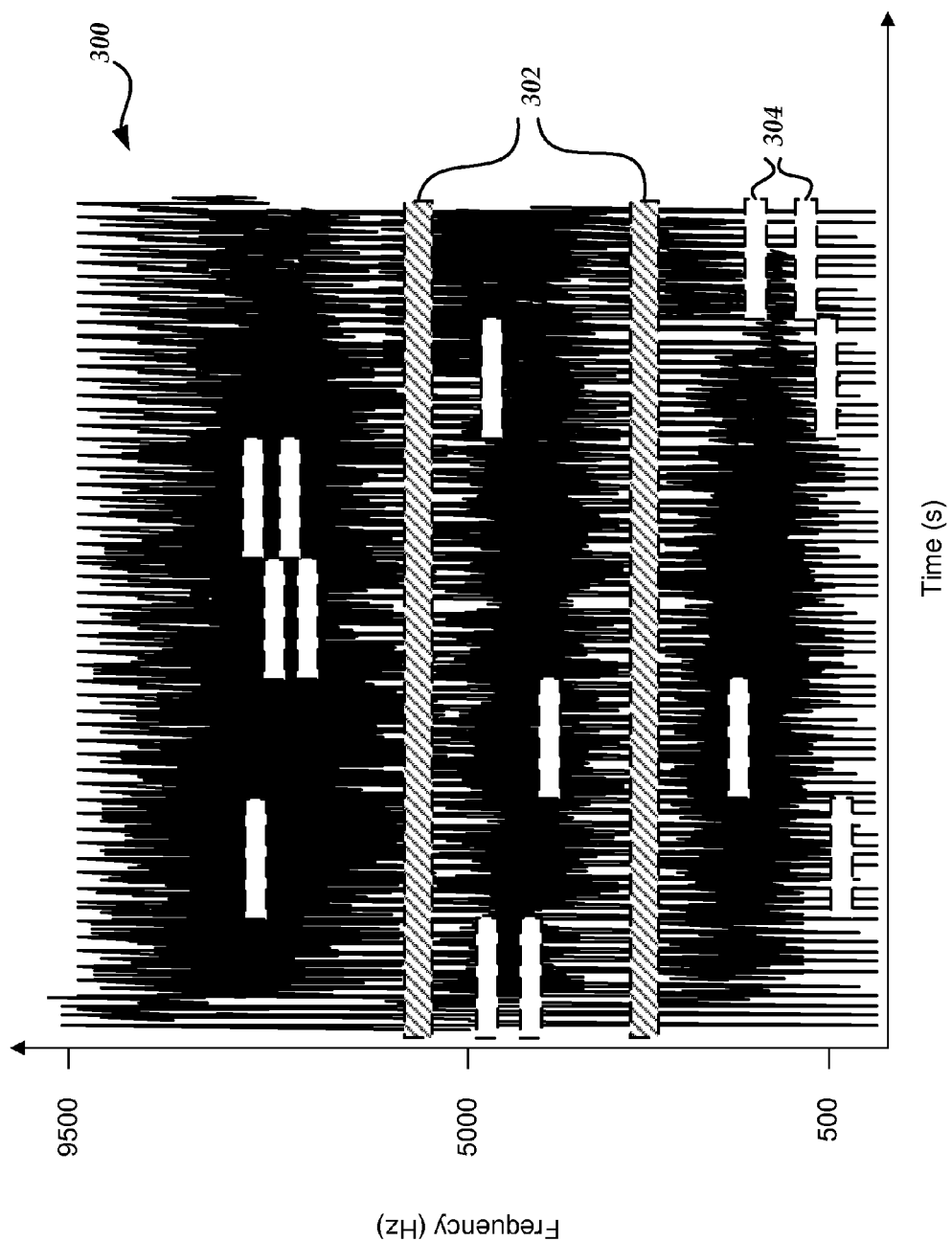
FIG. 3 is a spectrogram showing illustrative frequency bands that may be masked to for automatic speech recognition.

FIG. 3 shows an example spectrogram 300 of frequencies for a particular audio output signal, such as the requested piece of music. The spectrogram 300 shows frequencies from 0 Hz to 9.5 kHz over time. As shown, any given portion of the audio output signal may consist of data in one or more frequencies or frequency bands/ranges. Different portions of the frequency spectrum are more active than others at different points in time. The frequency band masking component 120 may use various techniques to determine which portion or portions of the frequency spectrum to filter and how to apply the filter(s). In some embodiments, one or more frequency bands 302 may be selected and masked for the duration of presentation of the audio signal. For example, the frequency band masking component 120 may be configured to always filter out the same frequency bands 302. As another example, the frequency band masking component 120 may obtain metadata associated with the audio output signal. The metadata may indicate the genre of music, the acoustic profile, or some other information that can be used to select the particular frequency bands 302 to filter. As yet another example, the frequency band masking component 120 can analyze the audio signal itself to determine which portions of the frequency spectrum to filter based on, e.g., where the filter will produce the lowest perceivable loss in audio quality. As a further example, the frequency band masking component 120 can obtain information about the user 106 or the user's vocal characteristics. Such information can be used to determine which frequency bands are likely to include important utterance information, and those frequency bands can be filtered from the output audio signal. In some embodiments, combinations of these and/or any other scheme may be used to select the particular frequencies or frequency bands to filter form the output signal.

In some embodiments, the frequency band masking component 120 may select different frequency bands 304 for different portions of the signal. For example, the frequency band masking component 120 may buffer (or have access to a buffer) several seconds of the audio signal prior to output of the signal. The frequency band masking component 120 can analyze the acoustic features or other characteristics of the signal and dynamically change which frequencies or frequency bands to filter at different points in time.

The particular bands of the frequency spectrum that are filtered may correspond to portions that include less audio information than other frequency bands over the course of the audio signal or for some period of time. In some embodiments, the particular frequency bands may be randomly selected or distributed about the frequency spectrum so as to reduce the effect on overall audio perception.

Returning to FIG. 1, the frequency band masking component can apply filters to the selected frequency bands. The filters may be binary (e.g., filter all or none of the signal in the given frequency band), or they may be weighted (e.g., filter only a portion of the signal in the given frequency band). For example, the filters may attenuate the signal by some predetermined or dynamically determined amount (e.g., −5 dB, −20 dB, etc.). Weights for weighted filters may be chosen so as to optimize the expected signal to noise ratio ("SNR") of the output and/or input at the corresponding frequency band. In some embodiments, the filters may be finite impulse response ("FIR") filters, such as linear phase FIR filters.

The presentation device 104 may receive the filtered audio signal at (B). Returning to the example above, a piece of classical music may be selected for presentation by the presentation device 104. The frequency band masking component 120 may have selected filters for one or more frequency bands of the audio signal as described above, and the filtered signal can be provided to the presentation device 104.

At (C), the presentation device 104 may present the filtered audio signal to the user 106. During presentation of the audio signal, the user may make an utterance at (D). For example, the user may say "Skip to the next track." The microphone 122 may receive both the currently presented audio signal and also the user utterance. The microphone can provide the combination of the currently presented audio signal and the user utterance to the frequency band masking component 120 at (E). In some embodiments, different components may receive the output audio signal for the presentation device and the output of the microphone, rather than a single component as shown in FIG. 1.

The frequency band masking component 120 can apply any appropriate input mask at (F). In some embodiments, the frequency band masking component 120 can select a mask that is complementary to the output mask applied at (A). For example, if the frequency band masking component filtered frequency bands 302 in FIG. 3 from the output at (A), the frequency band masking component may filter all but those frequency bands 302 from the input at (F). In this way, only frequency bands which are relatively free of sound from the output signal are passed to the ASR module 124 at (G). In some embodiments, the input received from the microphone 122 is not further filtered, but is provided to the ASR module 124 at (G) relatively unaltered, or after being processed by an acoustic echo canceller (not shown), as described in greater detail below.

The ASR module 124 can obtain an acoustic model at (H) for use in performing speech recognition on the input audio signal. For example, the acoustic models data store 126 may include various acoustic models which have been trained for use on audio signals that have been filtered as described above. The ASR module 124 can obtain the correct acoustic model based on, e.g., information provided by the frequency band masking component 120 regarding which mask was applied, which individual frequencies or frequency bands were filtered, etc. The ASR module 124 can then perform speech recognition on the audio signal at (I) using the model obtained from the acoustic models data store 126. In some embodiments, there may not be multiple acoustic models available, and therefore no determination of which acoustic model to use is made. For example, when the frequency band masking component 120 is configured to filter the same frequency band or bands from every output signal, then a single acoustic model trained for use with such audio may be available.

Process for Masking Output and Performing ASR

Figure 4:
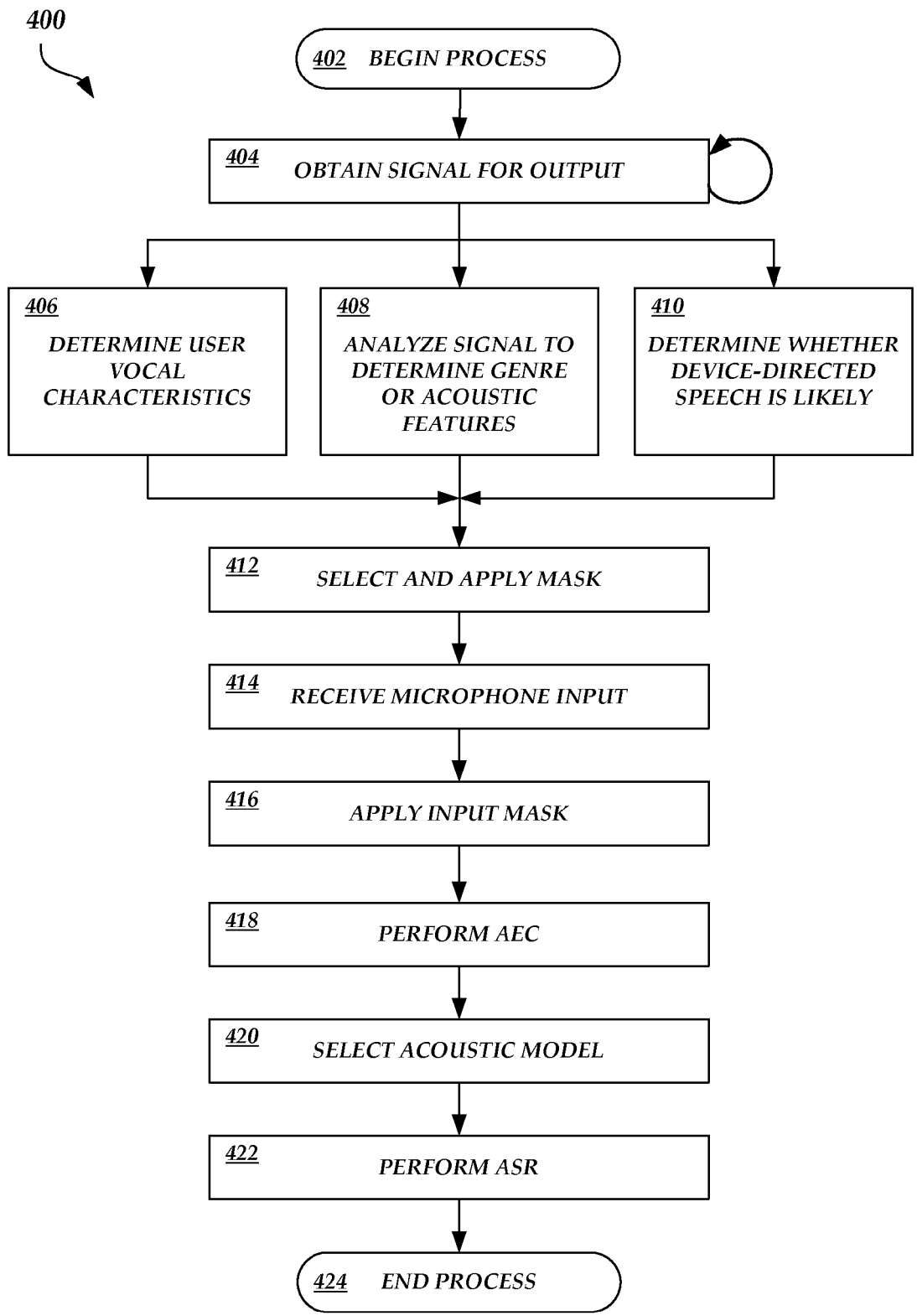
FIG. 4 is a flow diagram of an illustrative process for masking audio output and performing automatic speech recognition.

With reference now to FIG. 4, a sample process 400 for masking portions of audio output in order to improve ASR will be described. Advantageously, a system or device performing the process 400 can apply frequency band filters designed to meet or optimize for some criteria. The filters may be designed based on models of the frequency spectrum that indicate areas of less sensitivity among human subjects but which also include speech information.

In some embodiments, test data or training data may be obtained and processed in order to determine which portions of the frequency spectrum are most important from the standpoint of ASR processing. The test data may include samples of utterance audio data (e.g., recordings of actual user utterances or synthesized user utterances) and known correct transcriptions of those utterances. One or more frequency bands can be filtered or isolated from the audio data, and ASR can be performed. The ASR results can be compared against the known correct transcriptions, and an error rate or other score can be generated. The score can indicate the accuracy of the ASR processing when those particular frequency bands are filtered or isolated. The process may be repeated for all samples in the training data, or some portion thereof, with the same frequency bands filtered or isolated. Different frequency bands may then be chosen and the process may be repeated in an iterative fashion until a desired number of frequency bands have been tested. The scores obtained from this process can be used to determine which frequency bands have the greatest impact on ASR results, and are therefore the most important. In addition, the process may be performed on portions of training data which have been separated by, e.g., vocal characteristics. For example, important frequency bands may be identified separately for men, women, children, different age groups, different languages, different dialects, different accents, etc. In some embodiments, the process may be performed on portions of training data which have been clustered according to any appropriate attribute, characteristic, or property, or some combination thereof.

In some embodiments, a similar procedure may be performed on samples of audio output. Test data or training data that includes various samples of audio output, such as music, movies, video games, and the like can be obtained. One or more frequency bands can be filtered from the audio output, and the effect of the filtering on user perception may be determined. For example, users may listen to filtered audio samples and unfiltered audio of the same samples, and attempt to identify the filtered samples. As another example, users may listen to filtered samples and be asked to score the quality of the filtered audio samples. As yet another example, automated processes may be performed to generate data regarding the quality of the filtered samples, such as measurements of SNR. These example processes or others may be repeated for different frequency bands, and the frequency bands which have the lowest negative impact on user-perceived quality, SNR, or some other measurement can then be candidates for frequency masks. In addition, the process may be performed on different types or genres of audio to identify, e.g., genre-specific frequency bands which have the lowest impact on user-perceived quality, SNR, etc.

Acoustic models can be trained for use with the particular frequency masks identified above. For example, some number n of frequency masks may be defined based on some measurement of ASR quality, user-perceived audio output quality, automated analysis of SNR, or the like. In addition, some number m of acoustic models may then be trained with particular sensitivity to the frequencies filtered according to the frequency masks. The acoustic models may correspond to the frequency masks on a 1-to-1 basis, on a 1-to-many basis, or on a many-to-many basis. At run-time of the audio content presentation process described below, a particular frequency mask may be chosen for application to the audio output, and a corresponding acoustic model may be chosen to perform ASR on the microphone input. In some embodiments, rather than defining separate acoustic models for each frequency mask or subset of frequency masks, a single acoustic model may be generated.

Figure 5:
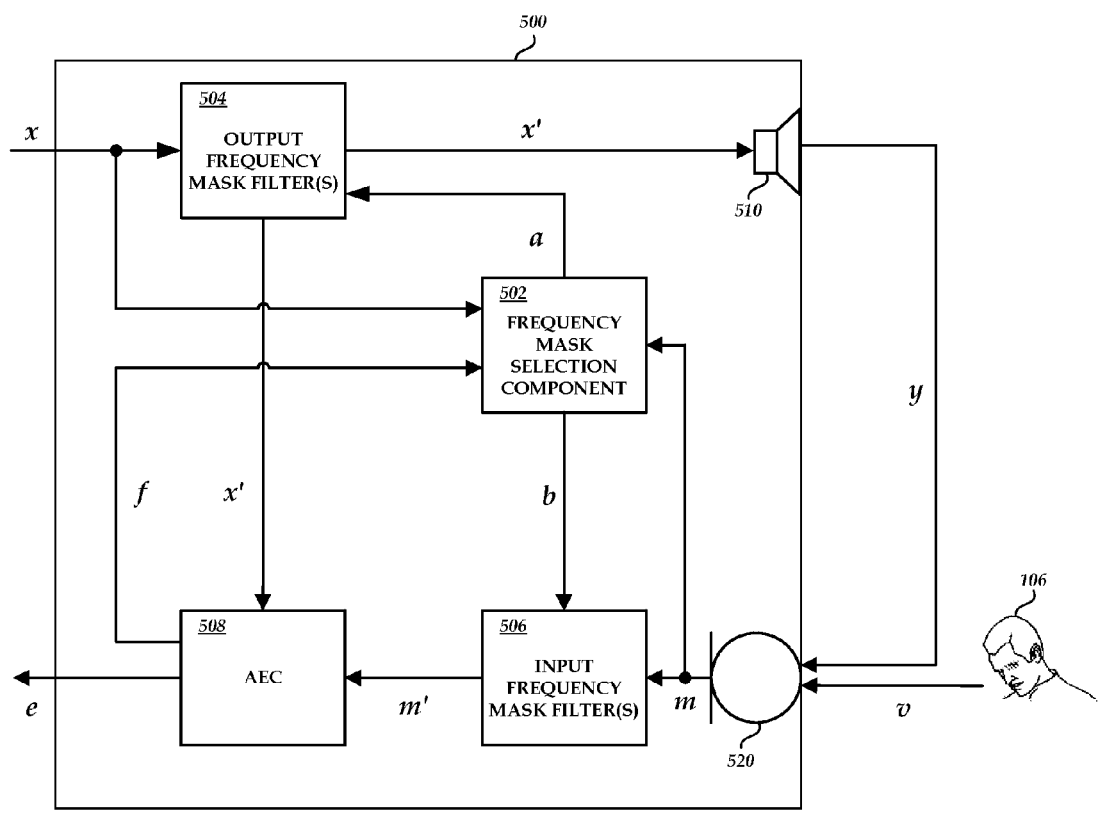
FIG. 5 is a signal diagram of illustrative relationships between signals and components used to mask audio output.

Returning to FIG. 4, the process 400 begins at block 402. The process 400 may be embodied in hardware, a set of executable program instructions, or a combination of hardware and executable program instructions. FIG. 5 is a signal diagram depicting an illustrative device 500 and various components that may be used to perform some or all of the process 400 and other techniques of the present disclosure. Although the process 400 of FIG. 4 will be described with respect to the modules and components of FIG. 5, the process 400 is not limited to implementation by, or in conjunction with, any specific module or component shown in FIG. 5. In some embodiments, the process 400, or some variant thereof, may be implemented by alternative modules or components, by the modules and components of FIG. 5 in a different configuration, etc.

At block 404, the device 500 may receive a signal x to be presented via an output component, such as a speaker 510. The signal x may be provided to a frequency mask selection component 502. Illustratively, the signal x may correspond to a piece of music, a movie, a television program, a video game or some other audio or audiovisual signal. The frequency mask selection component 502 may analyze the signal x and/or various other sources of information in order to select a mask to apply to the output signal. As described above, the mask may be a filter or set of filters. Each filter may be designed to reduce or remove a particular frequency or frequency band from the signal x.

At block 406, the frequency mask selection component 502 may determine user vocal characteristics or other information about the user. Such information can be used to select a frequency mask that reduces or removes frequency bands from the signal x that correspond to important information in signals containing utterance audio data from the user (or similar users).

At block 408, the frequency mask selection component 502 can analyze the signal x to determine features that may be used to select a frequency mask, such as a genre of music or acoustic features of the signal x. As described above, particular frequency masks may be designed for use with particular genres of music, particular acoustic features, and the like.

At block 410, the frequency mask selection component 502 can determine whether speech directed at the device 500 is likely within a particular period of time (e.g., within the next 3 seconds). For example, some spoken language processing systems may be configured to accept, process, and/or respond to spoken commands without any non-verbal indication that the user is going to issue a spoken command rather than engage in conversation with another person. The user may indicate that the spoken language processing system is being addressed by prefacing spoken commands and queries with a keyword or phrase, also known as a "wake word." The frequency mask selection component 502 may determine that the user is likely to address the system when e.g., the user has spoken the keyword, or initiated some task which is often followed shortly by a spoken command (e.g., music playback initiation may be followed shortly by a "next track" or "stop playback" command). If the user is likely to address the system, then the input mask may be more aggressive (e.g., more frequencies may be filtered, even if it reduces output sound quality). In some embodiments, the aggressive frequency mask may be applied for a limited period of time or until it becomes unlikely that the user will soon address the device. A more passive frequency mask may then be chosen such that audio output quality is optimized or improved.

Each of the analyses and determinations described above may be used individually or in combination to select a frequency mask to apply to the signal x. At block 412, the frequency mask selection component 502 can configure the output frequency mask filter 504 to apply the selected frequency mask. For example, the frequency mask selection component 502 may transmit a signal a to the output frequency mask filter 504 indicating which frequencies or frequency bands to filter. The output frequency mask filter 504 can then filter the signal x, giving signal x', which is presented by the speaker 510.

At block 414, the device 500 may obtain an input signal m from a microphone 520. As shown in FIG. 5, the signal m may include a combination of utterance audio v and an acoustic echo y of the filtered output signal x'. The signal m may be provided to the input frequency mask filter 506 and, in some embodiments, to the frequency mask selection component 502 so that an appropriate input mask may be chosen.

At block 416, input frequency mask filters 506 may be applied to the microphone signal m. The frequency mask selection component 502 may configure the input frequency mask filter 506 to apply a frequency mask that is complementary to the frequency mask applied by the output frequency mask filter 504 above. For example, the frequency mask selection component 502 may transmit a signal b to the input frequency mask filter 506 indicating which frequencies or frequency bands to filter from the microphone signal m.

At block 418, the filtered input signal m' may be provided to an acoustic echo canceller 508 for further processing. The AEC 508 can use a filtered reference signal x', received from the output frequency mask filter 504, in order to reduce or cancel the acoustic echo present in the filtered signal m'. Output signal e can then be provided to an ASR module or system, such as an ASR module that is integrated into the device 500 or to a network accessible spoken language processing system, as shown in FIG. 2.

In some embodiments, feedback f from the AEC 508 may be provided to the frequency mask selection component 502. The feedback may include data regarding the frequencies for which the AEC 508 has not been able to reduce a desired amount of acoustic echo, or for which the AEC 508 does not expect to be able to reduce a desired about of acoustic echo. The frequency mask selection component 502 may use this information to select or adjust frequency masks in order to compensate for the limitations or performance of the AEC 508. For example, if the AEC 508 expects to cancel 30 dB for a first frequency or frequency band, but only 15 dB for a second frequency or frequency band, the frequency mask selection component 502 may select or adjust a frequency mask to further reduce the output in the second frequency band.

In some embodiments, the acoustic echo canceller 508 may cancel the acoustic echo in the microphone signal m prior to application of any input filter by the input frequency mask filter 506. In some embodiments, acoustic echo cancellation is applied selectively (e.g., based on some predetermined or dynamically determined criteria). In other embodiments, acoustic echo cancellation is not performed at all.

At block 420, an ASR module or system can select an acoustic model to use in performing ASR on the signal e. The ASR module may select the acoustic model based on the particular frequency band filter(s) applied to the output signal and/or input signal.

At block 422, the ASR module or system can perform ASR on the signal e using the acoustic model selected above. At block 424 the process 400 terminates.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
one or more computing devices configured to at least:
receive an audio signal;
determine a frequency band based at least partly on a likelihood that audio input data regarding a user utterance will be present within the frequency band of a subsequent input signal;
generate a filtered output signal by filtering a portion of audio output data within the frequency band from the audio signal, wherein the filtered output signal is generated prior to receiving an input signal comprising audio data regarding the user utterance and presentation of the filtered output signal, and wherein filtering the portion of audio output data from the audio signal reduces energy of the audio signal in the frequency band;
generate audio using the filtered output signal;
receive the input signal, wherein the input signal comprises audio data regarding both the user utterance and presentation of the filtered output signal;
select an acoustic model of a plurality of acoustic models based at least partly on the acoustic model being associated with the frequency band; and
perform speech recognition using the input signal and the acoustic model to generate speech recognition results.

2. The system of claim 1, wherein the audio signal comprises music, and wherein a genre of music is used to determine the frequency band.

3. The system of claim 1, wherein the portion of the audio output data within the frequency band is filtered from the audio signal using a weighted filter.

4. The system of claim 1, wherein the one or more computing devices are further configured to determine a plurality of different frequency bands, wherein audio output data in each of the plurality of different frequency bands is to be filtered from the audio signal.

5. The device of claim 1, wherein the one or more computing devices are further configured to determine the frequency band to filter based at least partly on information regarding acoustic echo cancellation.

6. The system of claim 1, wherein the acoustic model is selected based on the acoustic model being trained to recognize subword units using audio data within the frequency band.

7. A computer-implemented method comprising:
as implemented by a computing device comprising one or more processors configured to execute specific instructions,
receiving a first signal comprising data regarding audio content;
determining a frequency band within which audio data regarding a user utterance is expected to be present in an input signal;
generating an output signal comprising a portion of the first signal, wherein the output signal is generated prior to receiving the input signal, wherein the input signal comprises audio data corresponding to the user utterance and presentation of the output signal, and wherein the output signal excludes a portion of the first signal having a frequency within the frequency band;
receiving the input signal, wherein the input signal comprises audio data corresponding to the user utterance and presentation of the output signal, and wherein a portion of the input signal comprising audio data corresponding to the user utterance has a frequency within the frequency band; and
providing the input signal to a speech recognizer.

8. The computer-implemented method of claim 7, wherein the portion of the first signal having the frequency within the frequency band is excluded from the output signal using a weighted filter.

9. The computer-implemented method of claim 7, further comprising determining the frequency band based at least partly on a characteristic of the first signal.

10. The computer-implemented method of claim 9, wherein the characteristic is determined using one of metadata associated with the first signal or an analysis of at least a portion of the first signal.

11. The computer-implemented method of claim 7, further comprising determining the frequency band based at least partly on a vocal characteristic of a user.

12. The computer-implemented method of claim 11, wherein the vocal characteristic is associated with one of: gender, age, language, dialect, or accent.

13. The computer-implemented method of claim 7, further comprising determining the frequency band based at least partly on a desired signal-to-noise ratio of the output signal for the frequency band.

14. The computer-implemented method of claim 7, wherein generating the output signal comprises excluding a second portion of the first signal, wherein the second portion is excluded based on a frequency of the second portion being within a second frequency band, wherein the second frequency band is different than the first frequency band, and wherein the second portion is different than the portion.

15. The computer-implemented method of claim 6, further comprising selecting an acoustic model of a plurality of acoustic models based at least partly on the frequency band.

16. The computer-implemented method of claim 15, wherein the acoustic model was trained using training data, and wherein at least a portion of audio data in the frequency band of the training data was filtered from the training data.

17. A device comprising:
means for receiving a first signal comprising data regarding audio content;
means for determining a frequency band within which audio data regarding a user utterance is expected to be present in an input signal;
means for generating an output signal comprising a portion of the first signal, wherein the output signal is generated prior to receiving the input signal, wherein the input signal comprises audio data corresponding to the user utterance and presentation of the output signal, and wherein the output signal excludes a portion of the first signal having a frequency within the frequency band;
means for receiving the input signal, wherein the input signal comprises audio data corresponding to the user utterance and presentation of the output signal, and wherein a portion of the input signal comprising audio data corresponding to the user utterance has a frequency within the frequency band; and
means for providing the input signal to a speech recognizer.

18. The device of claim 17, wherein the portion of the first signal having the frequency within the frequency band is filtered using a weighted filter.

19. The device of claim 17, further comprising means for determining the frequency band based at least partly on a characteristic of the first signal.

20. The device of claim 19, wherein the characteristic is determined using one of metadata associated with the first signal or an analysis of at least a portion of the first signal.

21. The device of claim 17, wherein the means for generating the output signal generates the output signal by excluding a second portion of the first signal, wherein the second portion is excluded based on a frequency of the second portion being within a second frequency band, wherein the second frequency band is different than the first frequency band, and wherein the second portion is different than the portion.

22. The device of claim 17, wherein the portion of the first signal having the frequency in the frequency band is filtered in anticipation of receiving a user utterance.

23. The device of claim 17, further comprising means for selecting an acoustic model of a plurality of acoustic models based at least partly on the frequency band.

24. The device of claim 23, wherein the acoustic model is trained to prioritize the frequency band in performing speech recognition.

25. The device of claim 17, further comprising means for determining the frequency band based at least partly on information regarding acoustic echo cancellation.

* * * * *